US011178265B2

(12) United States Patent
Kajioka et al.

(10) Patent No.: US 11,178,265 B2
(45) Date of Patent: Nov. 16, 2021

(54) COVER MEMBER AND INFORMATION DEVICE

(71) Applicant: NIPPON ELECTRIC GLASS CO., LTD., Shiga (JP)

(72) Inventors: Toshiyuki Kajioka, Otsu (JP); Koji Ikegami, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 16/631,089

(22) PCT Filed: Jul. 9, 2018

(86) PCT No.: PCT/JP2018/025915
§ 371 (c)(1),
(2) Date: Jan. 14, 2020

(87) PCT Pub. No.: WO2019/017228
PCT Pub. Date: Jan. 24, 2019

(65) Prior Publication Data
US 2020/0153951 A1    May 14, 2020

(30) Foreign Application Priority Data
Jul. 20, 2017   (JP) .............................. JP2017-141070

(51) Int. Cl.
*H04M 1/02* (2006.01)
*G06F 3/041* (2006.01)
(Continued)

(52) U.S. Cl.
CPC ............. *H04M 1/0266* (2013.01); *G02B 1/11* (2013.01); *G06F 3/0412* (2013.01); *G06F 2203/04103* (2013.01)

(58) Field of Classification Search
CPC ......... H04M 1/0266; H04M 1/02; G02B 1/11; G06F 3/0412; G06F 2203/04103;
(Continued)

(56) References Cited

U.S. PATENT DOCUMENTS

| 9,436,223 B2 * | 9/2016 | Youn ...................... G02B 5/201 |
| 2011/0003619 A1 * | 1/2011 | Fujii ....................... C03C 15/00 |
| | | 455/566 |

(Continued)

FOREIGN PATENT DOCUMENTS

| JP | 2016-145968 A | 8/2016 |
| JP | 2016-153914 A | 8/2016 |

(Continued)

OTHER PUBLICATIONS

Japanese Office Action dated Apr. 5, 2021, Japanese Patent Application No. 2017-141070.

*Primary Examiner* — Pablo N Tran
(74) *Attorney, Agent, or Firm* — Proskauer Rose LLP

(57) ABSTRACT

A cover member used to cover a display device is disclosed that includes a first main surface arranged at a visually recognized side, a second main surface arranged opposite to the first main surface, a first light transmission portion, and a second light transmission portion. The first main surface on the second light transmission portion has an arithmetic mean surface height (Sa) that is smaller than an arithmetic mean surface height (Sa) of the first main surface on the first light transmission portion.

8 Claims, 3 Drawing Sheets

(51) Int. Cl.
*G06F 3/043* (2006.01)
*G02B 1/11* (2015.01)

(58) Field of Classification Search
CPC . G06F 3/041; G06F 3/043; B32B 3/02; B32B 3/10; C03C 15/00; H05K 5/03; H05K 5/00; H05K 13/00; G03B 17/02
See application file for complete search history.

(56) References Cited

U.S. PATENT DOCUMENTS

| | | | |
|---|---|---|---|
| 2012/0027399 A1* | 2/2012 | Yeates | G06F 1/1626 396/535 |
| 2012/0202010 A1* | 8/2012 | Uchida | B32B 7/06 428/157 |
| 2012/0229423 A1* | 9/2012 | Takamiya | G02B 5/0221 345/175 |
| 2013/0236645 A1 | 9/2013 | Chang et al. | |
| 2014/0085551 A1* | 3/2014 | Koo | G06F 3/0445 349/12 |
| 2014/0233161 A1* | 8/2014 | Liu | G06F 1/1626 361/679.01 |
| 2016/0357294 A1* | 12/2016 | Ozeki | B32B 3/02 |
| 2020/0191999 A1* | 6/2020 | Kajioka | G02B 5/0278 |
| 2020/0301521 A1* | 9/2020 | Fujita | G06F 3/03545 |
| 2020/0325064 A1* | 10/2020 | Amin | C03C 23/0025 |

FOREIGN PATENT DOCUMENTS

| | | |
|---|---|---|
| JP | 2017-001940 A | 1/2017 |
| JP | 2017-048090 A | 3/2017 |
| WO | 2014156399 A1 | 10/2014 |

* cited by examiner

COVER MEMBER AND INFORMATION DEVICE

TECHNICAL FIELD

The present invention relates to a cover member and an information device.

BACKGROUND ART

Patent Document 1 discloses a cover member used to cover a display device including a display panel. In the cover member, a main surface located at a visually recognized side is formed by an uneven surface to reduce reflection of the background. Further, Patent Document 2 discloses a known cover member including a portion that covers a sensor of a display device.

PRIOR ART LITERATURE

Patent Literature

Patent Document 1: Japanese Laid-Open Patent Publication No. 2016-153914
Patent Document 2: Japanese Laid-Open Patent Publication No. 2016-145968

SUMMARY OF THE INVENTION

Problem to be Solved by the Invention

As described above, the cover member covering the display device may cover, for example, a functional unit, such as a sensor, in addition to the display panel. The cover member applied to the display device including the display panel and the functional unit, which is not the display panel, can still be improved in terms of, for example, the visibility of images or the sensitivity of a sensor serving as the functional unit.

The present invention is made in view of such circumstances, and one object of the present invention is to provide a cover member that can be used for a display device including a display panel and a functional unit, which is not the display panel, in a preferred manner and to provide an information device that includes the cover member.

Means for Solving the Problem

A cover member that solves the above problem is used to cover a display device and comprises a first main surface, a second main surface, a first light transmission portion, and a second light transmission portion. The first main surface is arranged at a visually recognized side. The second main surface is arranged opposite to the first main surface. The first main surface on the second light transmission portion has an arithmetic mean surface height (Sa) that is smaller than an arithmetic mean surface height (Sa) of the first main surface on the first light transmission portion.

With this configuration, the first light transmission portion of the cover member can be used as a portion covering the display panel of the display device, and the second light transmission portion of the cover member can be used as a portion covering the functional unit of the display device. In this case, the first light transmission portion of the cover member reduces reflection of the background, and the second light transmission portion of the cover member ensures the light-transmissivity. This ensures the visibility of images displayed on the display panel and, for example, limits decreases in the light sensitivity when an optical sensor is used as the functional unit.

In the cover member, it is preferred that the arithmetic mean surface height (Sa) of the first main surface on the second light transmission portion be less than 20 nm.

This configuration improves the light-transmissivity of the second light transmission portion. This further limits decreases in the light sensitivity of an optical sensor of the display device, for example, when the second light transmission portion of the cover member is used as the portion covering the optical sensor.

Preferably, the cover member further includes an antireflection film arranged on the first main surface of the first light transmission portion.

With this configuration, the first light transmission portion of the cover member further reduces reflection of the background. This further improves the visibility of images displayed on a display panel of the display device, for example, when the first light transmission portion of the cover member is used as the portion covering the display panel.

Preferably, the cover member further includes an intermediate portion located between the first light transmission portion and the second light transmission portion. The intermediate portion includes a light shielding layer arranged on the second main surface of the intermediate portion. An arithmetic mean surface height (Sa) of the first main surface on the intermediate portion is a value closer to the arithmetic mean surface height (Sa) of the first main surface on the first light transmission portion than the arithmetic mean surface height (Sa) of the first main surface on the second light transmission portion.

With this configuration, the first main surface on the intermediate portion of the cover member also reduces reflection of the background in the same manner as the first main surface on the first light transmission portion.

Preferably, the cover member further includes an antireflection film arranged on the first main surface of the intermediate portion and the second light transmission portion.

With this configuration, it becomes difficult to visually recognize the boundary of the first main surface on the intermediate portion and the first main surface on the second light transmission portion in the cover member.

An information device comprises the cover member and the display device. The display device includes a display panel and a functional unit that is not the display panel. The first light transmission portion of the cover member is arranged to cover the display panel of the display device. The second light transmission portion of the cover member is arranged to cover the functional unit.

In the information device, it is preferred that the functional unit of the display device be an optical sensor.

Effect of the Invention

The present invention succeeds in providing a cover member that can be used for a display device including a display panel and a functional unit, which is not the display panel, in a preferred manner and an information device including the cover member.

MODE FOR CARRYING OUT THE INVENTION

Figure 1:
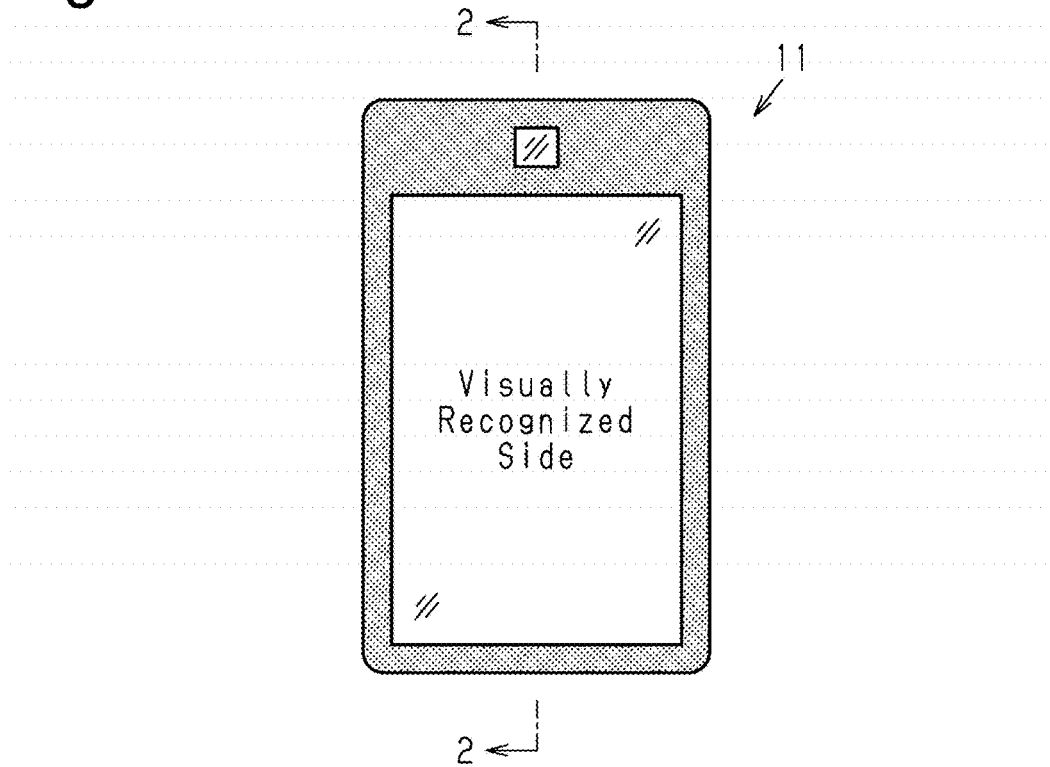
FIG. 1 is a plan view showing a cover member of an embodiment.

One embodiment of a cover member and an information device will now be described with reference to the drawings. The drawings may not be to scale, and the proportions and depiction of elements in the drawings may be exaggerated for illustration and convenience.

Figure 2:
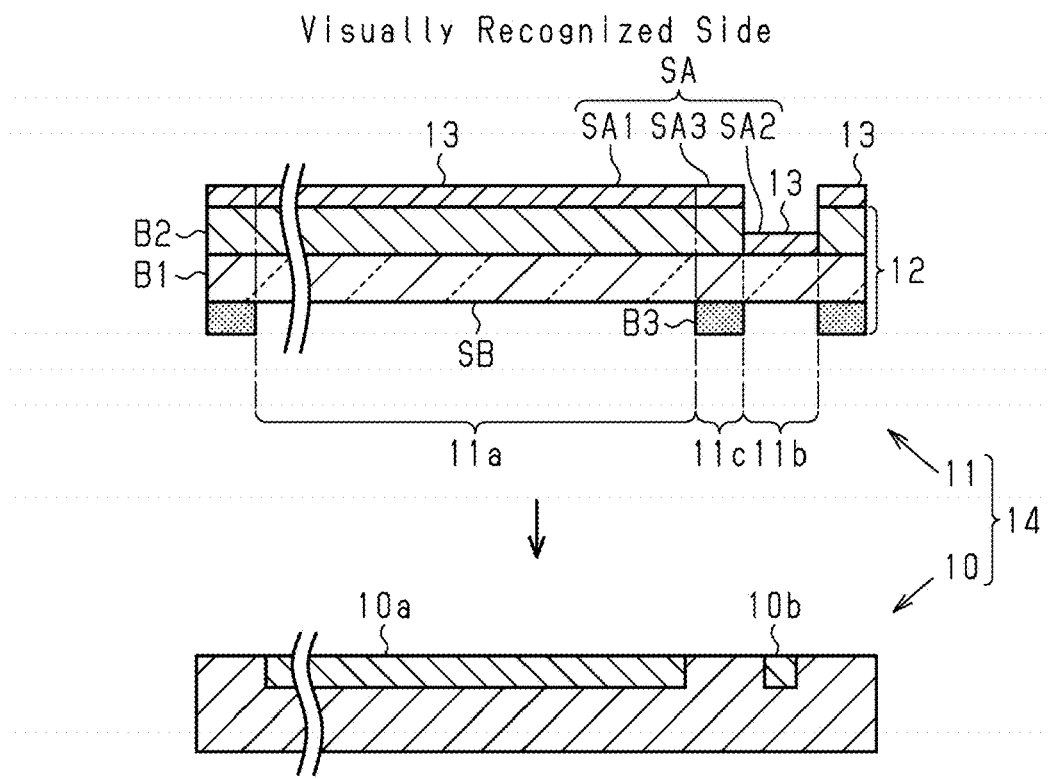
FIG. 2 is an end view of the cover member and a display device taken along line 2-2 in FIG. 1.

As shown in FIGS. 1 and 2, a cover member 11 is used to cover a display device 10. The cover member 11 includes a first main surface SA and a second main surface SB. The first main surface SA is arranged at a visually recognized side and the second main surface SB is arranged opposite to the first main surface SA. The cover member 11 of the present embodiment further includes a cover body 12 and an antireflection film 13. The antireflection film 13 is arranged on a surface of the cover body 12 at the side of the first main surface SA (visually recognized side).

As shown in FIG. 2, the cover member 11 includes a first light transmission portion 11a, a second light transmission portion 11b, and an intermediate portion 11c located between the first light transmission portion 11a and the second light transmission portion 11b. The first light transmission portion 11a and the second light transmission portion 11b are located at different positions in a plane that is orthogonal to a thickness-wise direction of the cover member 11.

The first light transmission portion 11a of the cover body 12 includes a base material B1 and a coating B2. The coating B2 includes an uneven surface. The second light transmission portion 11b of the cover body 12 includes the base material B1.

The intermediate portion 11c of the cover body 12 includes the base material B1, the coating B2 having the uneven surface, and a light shielding layer B3.

The light shielding layer B3 of the intermediate portion 11c is laminated on a rear surface of the base material B1 at the side opposite to the visually recognized side. That is, the light shielding layer B3 is arranged on a surface of the intermediate portion 11c at the side of the second main surface SB of the cover member 11 (opposite to visually recognized side). As shown in FIG. 1, the light shielding layer B3 of the present embodiment is frame-shaped and surrounds the second light transmission portion 11b in a plan view.

The base material B1 of the cover body 12 is formed from glass or a resin material. The glass may be known glass such as alkali-free glass, alumino-silicate glass, or soda lime glass. Further, reinforced glass such as chemically reinforced glass or crystallized glass such as LAS-type crystallized glass may be used. Preferably, alumino-silicate glass is used as the glass. Further preferably, the alumino-silicate glass includes 50% to 80% by mass of $SiO_2$, 5% to 25% by mass of $Al_2O_3$, 0% to 15% by mass of $B_2O_3$, 1% to 20% by mass of $Na_2O$, and 0% to 10% by mass of $K_2O$.

The resin material is not particularly limited as long as the resin material is light-transmissive. Examples of the resin material include acrylic resin, such as polymethylmethacrylate; polycarbonate resin; and epoxy resin.

The base material B1 may have a thickness that is set in accordance with its mechanical and physical properties. Preferably, the thickness is, for example, in a range of 0.05 mm or greater and 10 mm or less.

The coating B2 scatters light with the uneven surface to reduce reflection of the background on the first main surface SA of the cover member 11. That is, the coating B2 has an anti-glare (AG) capability. Preferably, the coating B2 is formed by, for example, at least one type of oxide selected from $SiO_2$, $Al_2O_3$, $ZrO_2$, and $TiO_2$. The coating B2 has a thickness in a range of, for example, 40 to 500 nm.

As shown in FIG. 2, the antireflection film 13 of the cover member 11 is arranged on the coating B2 of the cover body 12. The antireflection film 13 of the present embodiment is arranged over the entire coating B2 of the cover body 12.

Preferably, the antireflection film 13 is a dielectric multilayer film in which high refractive index films and low refractive index films having a lower refractive index than the high refractive index films are alternately laminated. Examples of a material for the high refractive index film include, for example, at least one selected from niobium oxide, titanium oxide, tantalum oxide, lanthanum oxide, tungsten oxide, and zirconium oxide. Preferably, the high refractive index film includes niobium oxide. Examples of a material for the low refractive index film include, for example, at least one selected from silicon oxide and aluminum oxide. Preferably, the low refractive index film includes silicon oxide. In the dielectric multilayer film, it is preferred that the total number of laminated layers of the high refractive index films and the low refractive index films be greater than or equal to four and less than or equal to sixty.

Further, examples of the antireflection film 13 also include low refractive index films, such as silica, and, preferably, films including a hollow inorganic oxide, such as hollow silica.

A first main surface SA1 on the first light transmission portion 11a of the cover member 11 and a first main surface SA2 on the second light transmission portion 11b of the cover member 11 have different surface properties. In the cover member 11, the first main surface SA2 on the second light transmission portion 11b has an arithmetic mean surface height (Sa) that is smaller than an arithmetic mean surface height (Sa) of the first main surface SA1 on the first light transmission portion 11a. The arithmetic mean surface height (Sa) of the first main surface SA2 on the second light transmission portion 11b is preferably less than 20 nm and further preferably less than or equal to 10 nm. This further improves the light-transmissivity of the second light transmission portion 11b.

The arithmetic mean surface height (Sa) of the first main surface SA1 on the first light transmission portion 11a is preferably 20 nm or greater, further preferably 30 nm or greater, and even further preferably 40 nm or greater. This further reduces reflection of the background on the first light transmission portion 11a. The arithmetic mean surface height (Sa) of the first main surface SA1 on the first light transmission portion 11a is preferably 500 nm or less, further preferably 400 nm or less, and even further preferably 300 nm or less. This easily ensures the light-transmissivity of the first light transmission portion 11a.

In order to reduce reflection of the background on the first light transmission portion 11a, it is preferred that the first light transmission portion 11a have a haze value of 5% or greater.

A first main surface SA3 on the intermediate portion 11c of the cover member 11 and the first main surface SA2 on the second light transmission portion 11b of the cover member 11 have different surface properties. The first main surface SA3 on the intermediate portion 11c of the cover member 11 has an arithmetic mean surface height (Sa) that is greater than that of the first main surface SA2 on the second light transmission portion 11b. The arithmetic mean surface height (Sa) of the first main surface SA3 on the intermediate portion 11c of the cover member 11 is a value closer to the arithmetic mean surface height (Sa) of the first main surface SA1 on the first light transmission portion 11a than the arithmetic mean surface height (Sa) of the first main surface SA2 on the second light transmission portion 11b. The difference in the arithmetic mean surface height (Sa) between the first main surface SA3 on the intermediate portion 11c and the first main surface SA1 on the first light transmission portion 11a is preferably 5 nm or less and further preferably null.

The arithmetic mean surface height (Sa) of the first main surface SA3 on the intermediate portion 11c is preferably 20 nm or greater, further preferably 30 nm or greater, and even further preferably 40 nm or greater. This further reduces reflection of the background on the intermediate portion 11c. The arithmetic mean surface height (Sa) of the first main surface SA3 on the intermediate portion 11c is preferably 500 nm or less, further preferably 400 nm or less, and even further preferably 300 nm or less. This facilitates visual recognition of the color tone of the light shielding layer B3 at the visually recognized side.

The arithmetic mean surface height (Sa) of the first main surface SA of the cover member 11 may be measured in accordance with ISO 25178. In a case where the antireflection film 13 is formed like in the present embodiment, the arithmetic mean surface height (Sa) of the first main surface SA of the cover member 11 is measured after forming a film of gold having a thickness of 10 nm on the antireflection film 13 through vacuum vapor deposition. The haze value of the cover member 11 may be measured in accordance with JIS K7136 (2000). JIS K7136 (2000) corresponds to the international standard of ISO 14782 and the two are equivalent in technical content.

A method for manufacturing the cover member 11 will now be described.

The method for manufacturing the cover member 11 of the present embodiment includes a step for applying the coating B2 to the base material B1. In this step, part of the main surface of the base material B1 (portion of cover body 12 that becomes second light transmission portion 11b) is masked. Then, the coating B2 is formed on the main surface of the base material B1.

As a masking material, a known rubber-based, resin-based, or metal-based masking material may be used. The masking material may be of an applied type masking material or a tape type masking material.

The coating B2 is obtained by applying a coating solution including a precursor of the coating B2 on the base material B1 and then drying the coating solution. Preferably, the coating solution is applied by spray-coating. A known nozzle such as a twin-fluid nozzle or a single fluid nozzle may be used to spray-coat the coating solution. The surface property of the coating B2 of the cover body 12 can be controlled by, for example, varying the diameter of the droplets of the coating solution injected from the nozzle.

It is preferred that the droplets of the coating solution injected from the nozzle have a diameter of, for example, 0.1 to 100 μm and further preferably 1 to 50 μm. When the diameter of the droplets is 0.1 μm or greater, the coating can be formed in less time. When the diameter of the droplets is 100 μm or less, the coating B2 obtains an improved performance. The diameter of the droplets can be adjusted by, for example, varying the type of the nozzle, spraying pressure, or amount of liquid. For example, when a twin-fluid nozzle is used, the droplets become smaller as the spraying pressure increases, and the droplets become larger as the liquid amount increases. The diameter of the droplets corresponds to the Sauter mean diameter measured by a laser measurement instrument.

Examples of the precursor in the coating solution include, for example, an inorganic precursor, such as a silica precursor, an alumina precursor, a zirconia precursor, or a titania precursor. Preferably, the precursor of the coating B2 includes a silica precursor because it decreases the refractive index of the coating B2 and facilitates control of the reactivity. Examples of the silica precursor include a silane compound including a hydrolyzable group and a hydrocarbon group bound to a silicon atom, a hydrolytic condensate of a silane compound, and a silazane compound. Preferably, the silica precursor includes at least one of a silane compound and a hydrolytic condensate thereof to limit cracking in the coating B2.

The cover body 12 is obtained by applying the coating B2 to the base material B1 and then removing the masking material from the base material B1. Thus, the coating B2 is not formed on the portion of the base material B1 from which the masking material is removed, and the base material B1 is exposed to the outside at the second light transmission portion 11b.

The method for manufacturing the cover member 11 in the present embodiment further includes a step for applying the antireflection film 13 to the coating B2. Examples of the film formation process performed in this step include, for example, sputtering, vacuum vapor deposition, ion beam deposition, ion-plating, and chemical vapor deposition (CVD). Among these film formation processes, sputtering is preferred since the thickness of the antireflection film 13 can be controlled with high accuracy and the obtained antireflection film 13 has a stable quality.

The method for manufacturing the cover member 11 of the present embodiment includes a step for applying the light shielding layer B3 to the rear surface of the base material B1, which is opposite to the visually recognized side. The light shielding layer B3 can be applied by, for example, a printing process that prints a light shielding coating material (for example, black coating material) onto a predetermined area of the base material B1.

The display device 10 includes a display panel 10a and a functional unit 10b. The display panel 10a displays images. The images displayed on the display panel 10a may include characters. Examples of the display panel 10a include, for example, a liquid crystal panel, an organic electroluminescent (EL) panel, an inorganic EL panel, and a plasma panel. The functional unit 10b of the display device 10 in the present embodiment is an optical sensor. The optical sensor is, for example, a sensor that uses a specified wavelength range such as an infrared light sensor. An information device 14 including the display device 10 and the cover member 11 uses the optical sensor for, for example, transmitting and receiving data or as a proximity sensor, a human detecting sensor, or a motion sensor. The information device 14 may be, for example, a portable information terminal or an in-vehicle information device. The information device 14 may include the function of touch panel.

The above-described embodiment has the following advantages.

(1) The cover member 11 used for covering the display device 10 includes the first main surface SA, which is the visually recognized side, and the second main surface SB, which is arranged opposite to the first main surface SA. The cover member 11 includes the first light transmission portion 11a and the second light transmission portion 11b. The first main surface SA2 on the second light transmission portion 11b of the cover member 11 has an arithmetic mean surface height (Sa) that is smaller than the arithmetic mean surface height (Sa) of the first main surface SA1 on the first light transmission portion 11a.

With this structure, the first light transmission portion 11a of the cover member 11 can be used as a portion covering the display panel 10a of the display device 10, and the second light transmission portion 11b of the cover body 12 can be used as a portion covering the functional unit 10b of the display device 10. In this case, the first light transmission portion 11a of the cover member 11 reduces reflection of the background, and the second light transmission portion 11b of the cover member 11 ensures the light-transmissivity. This ensures the visibility of images displayed on the display panel 10a and limits decreases in the light sensitivity when an optical sensor is used as the functional unit 10b. Therefore, the cover member 11 can be applied in a preferred manner to the display device 10 including the display panel 10a and the functional unit 10b.

(2) In the cover member 11, it is preferred that the first main surface SA2 on the second light transmission portion 11b have an arithmetic mean surface height (Sa) of less than 20 nm. This further improves the light-transmissivity of the second light transmission portion 11b and limits decreases in the light sensitivity of the optical sensor in the display device 10. Thus, the cover member 11 can be applied in a further preferred manner to the display device 10 including the display panel 10a and an optical sensor.

(3) The cover member 11 further includes the antireflection film 13 arranged on the surface of the first light transmission portion 11a at the side of the first main surface SA1 (visually recognized side).

In this case, the first light transmission portion 11a further reduces reflection of the background thereby improving visibility of images displayed on the display panel 10a of the display device 10.

(4) The cover member 11 includes the intermediate portion 11c located between the first light transmission portion 11a and the second light transmission portion 11b. The intermediate portion 11c includes the light shielding layer B3 arranged on the second main surface SB of the intermediate portion (opposite to visually recognized side). The arithmetic mean surface height (Sa) of the first main surface SA3 on the intermediate portion 11c is a value closer to the arithmetic mean surface height (Sa) of the first main surface SA1 on the first light transmission portion 11a than the arithmetic mean surface height (Sa) of the first main surface SA2 on the second light transmission portion 11b.

In this case, reflection of the background can also be reduced on the first main surface SA3 of the intermediate portion 11c in the cover member 11 in the same manner as the first main surface SA1 on the first light transmission portion 11a. This improves the visibility of images displayed on the first light transmission portion 11a adjacent to the intermediate portion 11c, that is, the display panel 10a of the display device 10.

(5) When adjacent portions in the first main surface of the cover member have different the arithmetic mean surface heights (Sa) like the second light transmission portion 11b and the intermediate portion 11c, the boundary of the adjacent portions can easily be visually recognized. This may adversely affect, for example, the luxurious appearance of the information device.

In this respect, in the cover member 11 of the present embodiment, the antireflection film 13 is arranged on the surface of the intermediate portion 11c at the side of the first main surface SA3 and the surface of the second light transmission portion 11b at the side of the first main surface SA2. The antireflection film 13 reduces reflection of visible light emitted from the visually recognized side. Thus, it is difficult to visually recognize the boundary of the first main surface SA3 on the intermediate portion 11c and the first main surface SA2 on the second light transmission portion 11b of the cover member 11. This, for example, allows the information device 14 have a luxurious appearance and reduces awkwardness when viewing the cover member 11.

MODIFIED EXAMPLES

The above embodiment may be modified as follows.

The coating B2 of the cover member 11 may be omitted. For example, the main surface of the base material B1 in the cover member 11 at the side of the first main surface SA can be etched to form an uneven surface and adjust the arithmetic mean surface height (Sa) of the first main surface SA1 on the first light transmission portion 11a of the cover member 11. In this case, a known etching process may be applied, in which the base material B1 is immersed in an etching solution including hydrogen fluoride or hydrogen fluoride and ammonium. When such an etching process is used, the portion of the base material B1 that becomes the second light transmission portion 11b may be covered with, for example, a photoresist resin or a metal film to resist the etching solution. Then, the base material B1 may be immersed in the etching solution. Instead of the etching process, a sandblasting process may also be performed using, for example, particles of silicon dioxide, silicon carbide, or aluminum oxide to form an uneven surface on the base material B1.

Instead of masking the base material B1 like in the above embodiment, the first main surface SA2 on the second light transmission portion 11b of the cover member 11 may be formed by polishing the uneven surface formed by etching the base material B1 or the uneven surface on the coating B2.

The first light transmission portion 11a and the second light transmission portion 11b of the cover member 11 may be formed as described below. For example, after pretreating part of the main surface of the base material B1, the coating B2 is formed by spray-coating the above-described coating solution onto the main surface of the base material B1. The roughness of the pretreated portion of the uneven surface on the coating B2 can be adjusted through a hydrophilizing treatment or a hydrophobizing treatment, which is performed as the pretreatment of the base material B1. For example, a hydrophilizing treatment is performed on part of the main surface of the base material B1 and then an aqueous coating solution is spray-coated. This flattens the droplets of the coating solution spray-coated on the part of the main surface of the base material B1 and decreases the arithmetic mean surface height (Sa) of the uneven surface of the coating B2. Further, for example, a hydrophobizing treatment is performed on part of the main surface of the base material B1 and then an organic solvent-based coating solution is spray-coated. This flattens the droplets of the coating solution spray-coated on the part of the main surface of the base material B1 and decreases the arithmetic mean surface height (Sa) of the uneven surface of the coating B2. As a hydrophilizing treatment, for example, a hydrophilic liquid medium is coated or a plasma treatment is performed. As a hydrophobizing treatment, for example, part of the main surface is immersed in an organic solvent and then dried. Further, a hydrophilizing treatment and a hydrophobizing treatment may be combined. For example, the entire base material B1 may be immersed in an organic solvent and then plasma treatment may be performed on part of the main surface.

Figure 3:
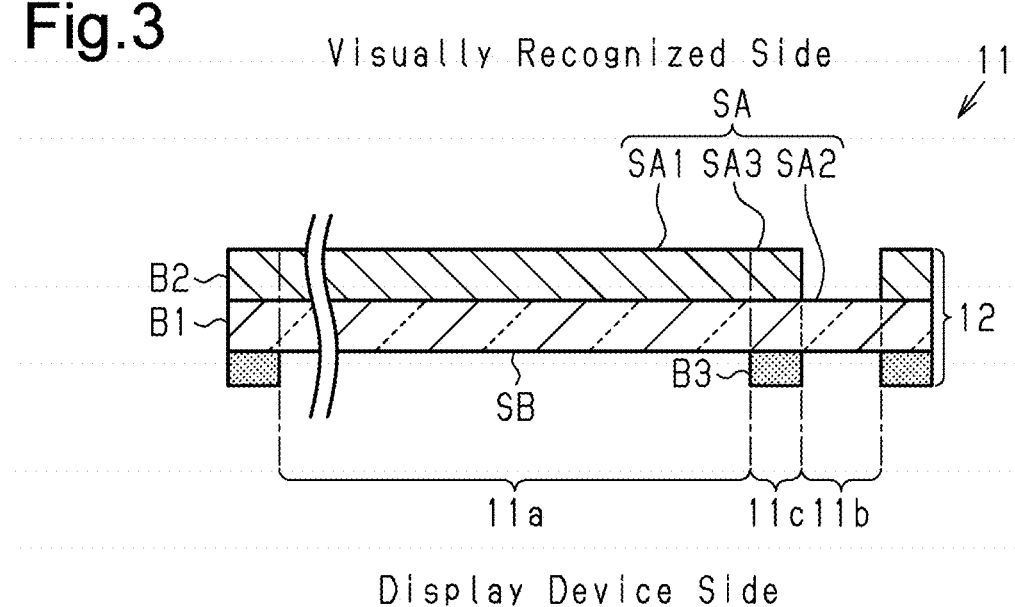
FIG. 3 is an end view showing a modified example of the cover member.

As shown in FIG. 3, the antireflection film 13 of the cover member 11 may be partially or entirely omitted.

The arithmetic mean surface height (Sa) of the first main surface SA3 on the intermediate portion 11c of the cover member 11 may be a value closer to the arithmetic mean surface height (Sa) of the first main surface SA2 on the second light transmission portion 11b than the arithmetic mean surface height (Sa) of the first main surface SA1 on the first light transmission portion 11a. For example, in the intermediate portion 11c, the surface of the cover body 12 at the side of the first main surface SA3 may be configured by the base material B1 instead of the uneven surface of the coating B2.

In the cover member 11, the intermediate portion 11c of the cover body 12 may be omitted. That is, the first light transmission portion 11a of the cover body 12 may be located adjacent to the second light transmission portion 11b. Even when the cover member 11 is configured as described above, it is preferred that the antireflection film 13 be further included. In this case, the boundary between the first main surface SA1 on the first light transmission portion 11a and the first main surface SA2 on the second light transmission portion 11b will be difficult to visually recognize. This, for example, allows the information device 14 to have a luxurious appearance and reduces awkwardness when visually recognizing the cover member 11.

Figure 4:
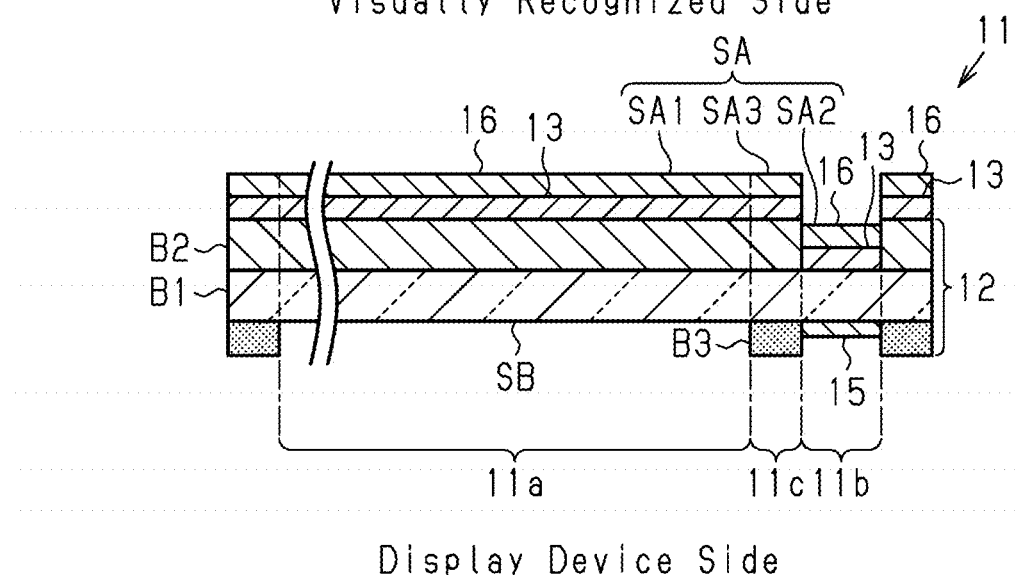
FIG. 4 is an end view showing a modified example of the cover member.

As shown in FIG. 4, the cover member 11 may further include an infrared light transmission layer 15 laminated on the second light transmission portion 11b of the cover body 12 to limit the transmission of light other than infrared light. This structure increases the reliability of an infrared light sensor used as the optical sensor, which is covered by the second light transmission portion 11b. The infrared light transmission layer 15 may be configured by, for example, a film having an optical filtering function or a printed layer of an infrared light-transmissive ink.

As shown in FIG. 4, the cover member 11 may further include an antifouling film 16 arranged at the outermost position at the visually recognized side. The antifouling film 16 may be formed by, for example, a fluorine-containing organosilicon compound. Examples of a film formation process of the antifouling film 16 include wet coating process or vacuum vapor deposition.

The functional unit 10b of the display device 10 may be, for example, an ornamental portion of a design, characters, or the like that is printed or formed by irregularities. Alternatively, the functional unit 10b may be, for example, a sensor other than an optical sensor (for example, sensor touched by human finger, such as capacitance type sensor). For example, when the second light transmission portion 11b of the cover body 12 is arranged to cover the ornamental portion, the color tone of the ornamental portion in the second light transmission portion 11b can be visually recognized more clearly. Moreover, for example, the arrangement of the second light transmission portion 11b of the cover body 12 to cover a sensor touched by a human finger produces a tactile feel of the second light transmission portion 11b that differs from the first light transmission portion 11a is thereby recognizable.

The contour of the cover member 11 may be changed in accordance with the shape of the display device 10. Specifically, the cover member 11 does not have to have the contour of a flat plate and may have the contour of, for example, a curved plate. Further, the contour of the cover member 11 does not have to be rectangular in a plan view and may be, for example, elliptic.

The cover member 11 may be configured to be coupled to a case of the display device 10 or attached to the main surface (for example, glass surface) of the display device 10.

EXPERIMENTAL EXAMPLES

Experimental examples will now be described.

In experimental example 1, a cover member configured as shown in FIG. 2 was produced. First, part of the main surface of the base material formed by a glass sheet was masked using silicone rubber as the masking material. Then, the coating solution was spray-coated to form an uneven surface on the base material. Next, after removing the silicone rubber from the main surface of the base material, an antireflection film was formed by performing sputtering on the main surface of the base material. The antireflection film was an dielectric multilayer film formed by four layers arranged on the base material in order of a high refractive index film (niobium oxide, thickness of 15 nm), a low refractive index film (silicon oxide, thickness of 30 nm), a high refractive index film (niobium oxide, thickness of 110 nm), and a low refractive index film (silicon oxide, thickness of 80 nm).

In experimental example 2, a cover member was produced and configured in the same manner as experimental example 1 except in that the formation of the antireflection film was omitted as shown in FIG. 3.

In the cover members of experimental examples 1 and 2, the arithmetic mean surface height (Sa) of the first main surface on the first light transmission portion and the arithmetic mean surface height (Sa) of the first main surface on the intermediate portion were both 106 nm. Further, in the cover members of experimental examples 1 and 2, the arithmetic mean surface height (Sa) of the first main surface on the second light transmission portion were both less than 10 nm.

In the cover member of experimental example 1, the first light transmission portion had a haze value of 16.0%. In the cover member of experimental example 2, the first light transmission portion had a haze value of 17.3%.

Figure 5A:
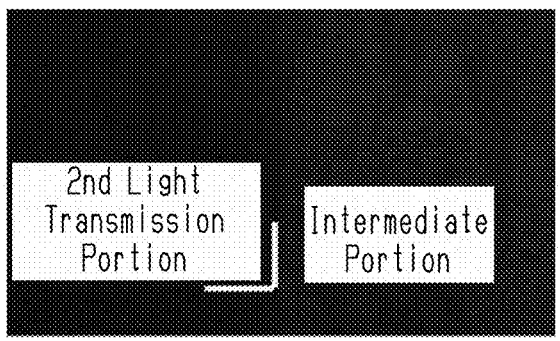
FIG. 5(a) is a photograph of the cover member of experimental example 1.

FIG. 5(a) is a photograph showing part of the cover member of experimental example 1 taken from the visually recognized side while illuminating the cover member with light of a fluorescent lamp from the visually recognized side. The L-shaped white lines added to the photograph indicate the actual corner of the second light transmission portion. As the photograph indicates, the boundary between the first main surface on the intermediate portion and the first main surface on the second light transmission portion is difficult to visually recognize in the cover member of experimental example 1.

Figure 5B:
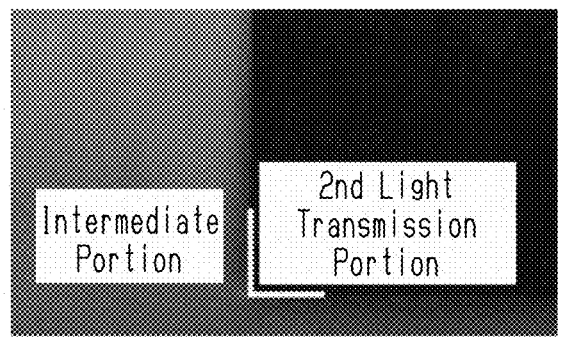
FIG. 5(b) is a photograph of the cover member of experimental example 2.

FIG. 5(b) is a photograph showing part of the cover member of experimental example 1 taken from the visually recognized side while illuminating the cover member with light of a fluorescent lamp from the visually recognized side. The L-shaped white lines added to the photograph indicate the actual corner of the second light transmission portion. As the photograph indicates, the boundary between the first main surface on the intermediate portion and the first main surface on the second light transmission portion is easy to visually recognize in the cover member of experimental example 2.

From the above result, when an antireflection film is arranged like in the cover member of experimental example 1, the above-described boundary is difficult to visually recognize. This allows the information device to have, for example, a luxurious appearance.

DESCRIPTION OF REFERENCE CHARACTERS 10) display device; 10a) display panel; 10b) functional unit; 11) cover member; 11a) first light transmission portion; 11b) second light transmission portion; 11c) intermediate portion; 13) antireflection film; 14) information device; B3) light shielding layer; SA, SA1, SA2, SA3) first main surface; SB) second main surface.

The invention claimed is:

1. A cover member used to cover a display device, the cover member comprising:
 a first main surface arranged at a visually recognized side;
 a second main surface arranged opposite to the first main surface;
 a first light transmission portion; and
 a second light transmission portion, wherein
 the first main surface on the second light transmission portion has an arithmetic mean surface height (Sa) that is less than 20 nm and is smaller than an arithmetic mean surface height (Sa) of the first main surface on the first light transmission portion,
 wherein the first light transmission portion is arranged to cover a display panel of the display device and the second light transmission portion of the cover member is arranged to cover a functional unit of the display device.

2. The cover member according to claim 1, further comprising an antireflection film arranged on the first main surface of the first light transmission portion.

3. The cover member according to claim 1, wherein
 the cover member further includes an intermediate portion located between the first light transmission portion and the second light transmission portion,
 the intermediate portion includes a light shielding layer arranged on the second main surface of the intermediate portion, and
 an arithmetic mean surface height (Sa) of the first main surface on the intermediate portion is a value closer to the arithmetic mean surface height (Sa) of the first main surface on the first light transmission portion than the arithmetic mean surface height (Sa) of the first main surface on the second light transmission portion.

4. The cover member according to claim 3, further comprising an antireflection film arranged on the first main surface of the intermediate portion and the second light transmission portion.

5. An information device, comprising:
 the cover member according to claim 1; and
 the display device, wherein
 the functional unit of the display device is not the display panel of the display device.

6. The information device according to claim 5, characterized in that the functional unit of the display device is an optical sensor.

7. The information device according to claim 5, wherein the first light transmission portion is configured to reduce reflection of a background and ensure the visibility of images displayed on the display panel.

8. The information device according to claim 6, wherein the second light transmission portion is configured to limit decreases in light sensitivity when the optical sensor is used as the functional unit.

* * * * *